United States Patent [19]

Otsuki

[11] Patent Number: 4,740,901
[45] Date of Patent: Apr. 26, 1988

[54] DISTANCE-OF-TRAVEL MEASURING EQUIPMENT FOR NUMERICAL CONTROLLER

[75] Inventor: Toshiaki Otsuki, Hino, Japan

[73] Assignee: Fanuc Ltd., Minamitsuru, Japan

[21] Appl. No.: 887,085

[22] PCT Filed: Nov. 14, 1985

[86] PCT No.: PCT/JP85/00635
§ 371 Date: Jul. 14, 1986
§ 102(e) Date: Jul. 14, 1986

[87] PCT Pub. No.: WO86/03309
PCT Pub. Date: Jun. 5, 1986

[30] Foreign Application Priority Data

Nov. 30, 1984 [JP] Japan ................................ 59-254787

[51] Int. Cl.$^4$ ............................................ G05B 19/21
[52] U.S. Cl. .................................................. 364/474
[58] Field of Search ........................... 364/167–171, 364/176, 177, 474, 475; 318/572, 632; 340/365 E; 377/20

[56] References Cited

U.S. PATENT DOCUMENTS 4,502,108 2/1985 Nozawa et al. .................... 364/474

*Primary Examiner*—Charles E. Atkinson
*Assistant Examiner*—Allen MacDonald
*Attorney, Agent, or Firm*—Staas & Halsey

[57] ABSTRACT

Equipment for a numerical controller is provided, for measuring the distance of travel of a tool through utilization of a skip function of a numerical controller and reducing a delay in detecting a skip signal thereby ensuring high precision measurement of the distance of travel. Position storage memory accumulates distribution command values, which are generated within a predetermined period, and second storage memory stores a stored value $P_0$ of the position storage memory directly before the execution of a distance measurement function code. A time counter is counted up by pulses which have a period shorter than the predetermined period and are applied thereto from a pulse generator, via a gate circuit, wherein the time counter is cleared within the predetermined period. Upon input of the skip signal, the gate circuit stops the supply of the pulses to the time counter. A first operating system obtains a difference P between an accumulated value A, of the position storage means at the instant of input of the skip signal, and the stored value $P_0$ in the position storage memory. Based upon the count value $\beta$ of the time counter at the instant of input of the skip signal, the maximum count value $\gamma$ of the time counter in the predetermined period, a variation $\alpha$ in the stored value of the position storage memory during the predetermined period, and the difference P. A second operating system obtains an amount of travel $P_n$, from the instant of the start of travel by the skip function, to the instant of input of the skip signal.

2 Claims, 3 Drawing Sheets

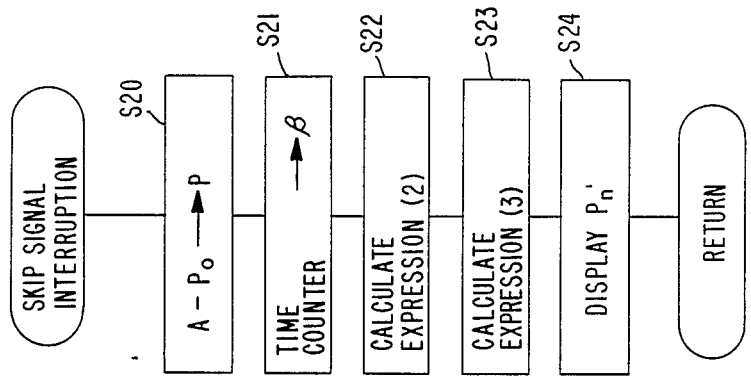
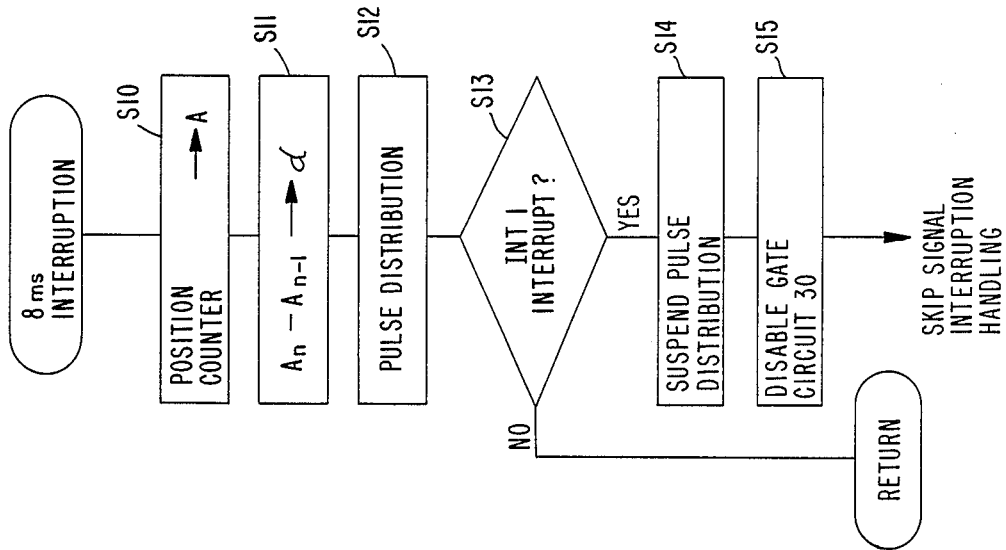
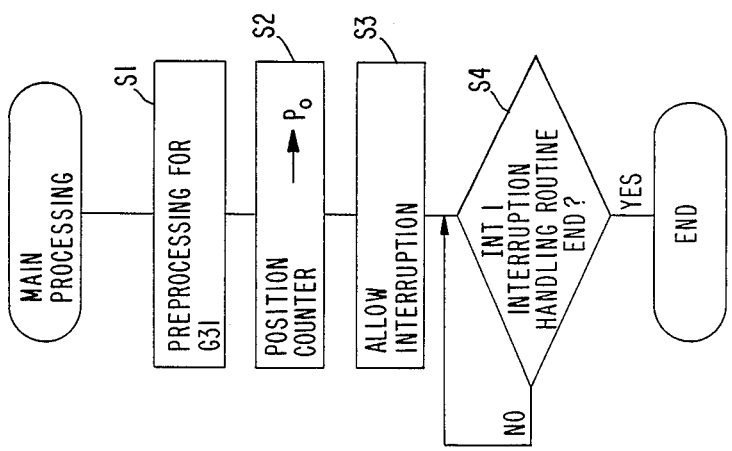

DISTANCE-OF-TRAVEL MEASURING EQUIPMENT FOR NUMERICAL CONTROLLER

BACKGROUND OF THE INVENTION

The present invention relates to distance-of-travel measuring equipment for a numerical controller.

A numerical controller has a function called a skip function. With this function, when a code, for example, G31 (a distance measuring function code), is followed by a move command, for instance, X1000, the numerical controller moves a movable machine part in the X-axis direction through a linear interpolation, which is a process for finding a value of a function between two known values under the assumption that three points lie on a straight line, as in the case of G01; and when a skip signal is input from an outside source in the execution of the command, the numerical controller proceeds to the next block or suspends its operation, leaving the commanded distance of travel 1000 unfinished. This function can be utilized when the amount of travel is indefinite, and so it is suitable for use in measuring a tool length in combination with a touch sensor.

FIGS. 3(A) and (B) are explanatory views of a tool length measuring system employing the skip function and the touch sensor in combination.

In general, the tool length L indicates the length from a reference point 0 of a tool 1 attached to a chuck 2 to the tip of the tool 1. Next, let the actual position of the reference point 0 and the distance to the sensing face of a touch sensor 3, disposed at a position $P_1$, be represented by $P_0'$ and $X_0$, respectively, as depicted in FIG. 3(A). Assuming that when the actual position of the reference point 0 reaches a point $P_x'$, as a result of travel of the tool 1 in the X-axis direction through the skip function, as shown in FIG. 3(B), the tip of the tool 1 abuts against the sensing face of the touch sensor 3 and at the same time a skip signal is generated by the touch sensor 3, stopping the travel of the tool 1. The actual amount of travel $P'$ of the tool can be obtained by subtracting $P_0'$ from $P_x'$, and the tool length L can be determined by subtracting $P'$ from $x_0$.

Conventional numerical control equipment obtains the abovementioned amount of travel $P'$ by subtracting the current position $P_0$ in the equipment immediately before the execution of the skip function, from the current position $P_x$ in the equipment at the instant of the application of the skip signal. However, in the case where the machine was stopped prior to the execution of the skip function, $P_0$ will be equal to $P_0'$, and $P_x$ will become greater than $P_x'$ by a value corresponding to a time lag of servo, or if the feed was accelerated and decelerated, by the corresponding value. Thus, the prior art has encountered the problem that the tool length could not accurately be measured.

The present invention succeeds in solving this problem by the employment of an arrangement including: a feed rate Fm; an acceleration/deceleration time constant TC; a servo time constant TS; and a time lag TR of a skip signal receiving system, which are all prestored in a memory. The distance $P_n$ from the machine position immediately prior to the execution of the abovesaid code, to the machine position at the instant of application of the skip signal is automatically computed. The computation uses the following expression which is based on the current position $P_x$ in the numerical controller at the time of the application of the skip signal, the feed rate Fm, the acceleration/deceleration time constant TC, the servo time constant TS, and the time lag TR.

$$P_n = P - Fm(TC + TS + TR)/60 \times 1000 \tag{1}$$

where $P = P_x - P_0$, the feed rate Fm is given in mm/min and the acceleration/deceleration time constant, the servo time constant and the time lag of the skip signal receiving system are given in msec.

With such an arrangement, a measurement error resulting from acceleration/deceleration, a time lag of servo, or the like, can automatically be corrected, therefore enabling the amount of travel to be obtained with relatively high accuracy.

However, there is an error which cannot yet be eliminated even by such an arrangement. It is caused by a delay in detecting the skip signal. Conventionally, whether the skip signal has been input or not is detected by monitoring the output of the skip signal receiving circuit through software with a time period of 2 ms, therefore the rise of the skip signal cannot be detected with an accuracy of less than 2 ms. The delay in detecting the skip signal varies each time and cannot be included in the abovementioned expression (1), and the solution to this problem has been greatly desired. The detection delay could be reduced by shortening the skip signal monitoring period, but this would present the problem of increased load on software.

SUMMARY OF THE INVENTION

The present invention is intended to eliminate such a defect of the prior art and has for an object reducing the delay in the detection of the skip signal without increasing the load on software, thereby providing for enhanced accuracy in the measurement of the distance of travel.

To solve this problem, according to the present invention, a numerical controller, which functions to execute a linear interpolation by applying a move command in the form of a distance measuring function code and by suspending the execution of the move command upon application of a skip signal from an outside source in the execution of the command, is provided for as follows:

(1) Position storage means for accumulating distribution command values which are generated with a predetermined period for executing the move command in the form of the abovesaid code;

(2) means for storing a stored value $P_0$ of the position storage means immediately prior to the execution of the code;

(3) A time counter which is cleared with the predetermined period;

(4) A pulse generator for creating pulses of a period shorter than the predetermined period;

(5) A gate circuit for applying the output pulses from the pulse generator, as count-up pulses, to the time counter until the skip signal is input;

(6) First operating means for obtaining a difference P between a stored value A of the position storage means at the instant of input of the skip signal and the stored value $P_0$; and (7) Second operating means for obtaining an amount of travel $P_n$ at the instant of input of the skip signal on the basis of the count value $\beta$ at the instant of input of the skip signal, the maximum count number $\gamma$ of the time counter during the predetermined period, a variation α, which is determined by a CPU, in the stored value of the position storage means during the predetermined period and the difference P.

The contents of the position storage means are updated for every predetermined period, and when the skip signal is input in the middle of a certain predetermined period, the stored value of the position storage means indicates the position at the end of the immediately preceding predetermined period. The time interval between the end of the immediately preceding predetermined period and the input of the skip signal is known from the contents of the time counter, therefore the remaining amount of travel is obtained from the above time interval and the variation α in the stored value of the position storage means in the predetermined period.

BRIEF DESCRIPTION OF THE DRAWINGS

FIGS. 2A, 2B and 2C are flowcharts showing an example of the processing of a CPU 10 as applied to the present invention.

DETAILED DESCRIPTION OF THE PREFERRED EMBODIMENTS

Figure 1:
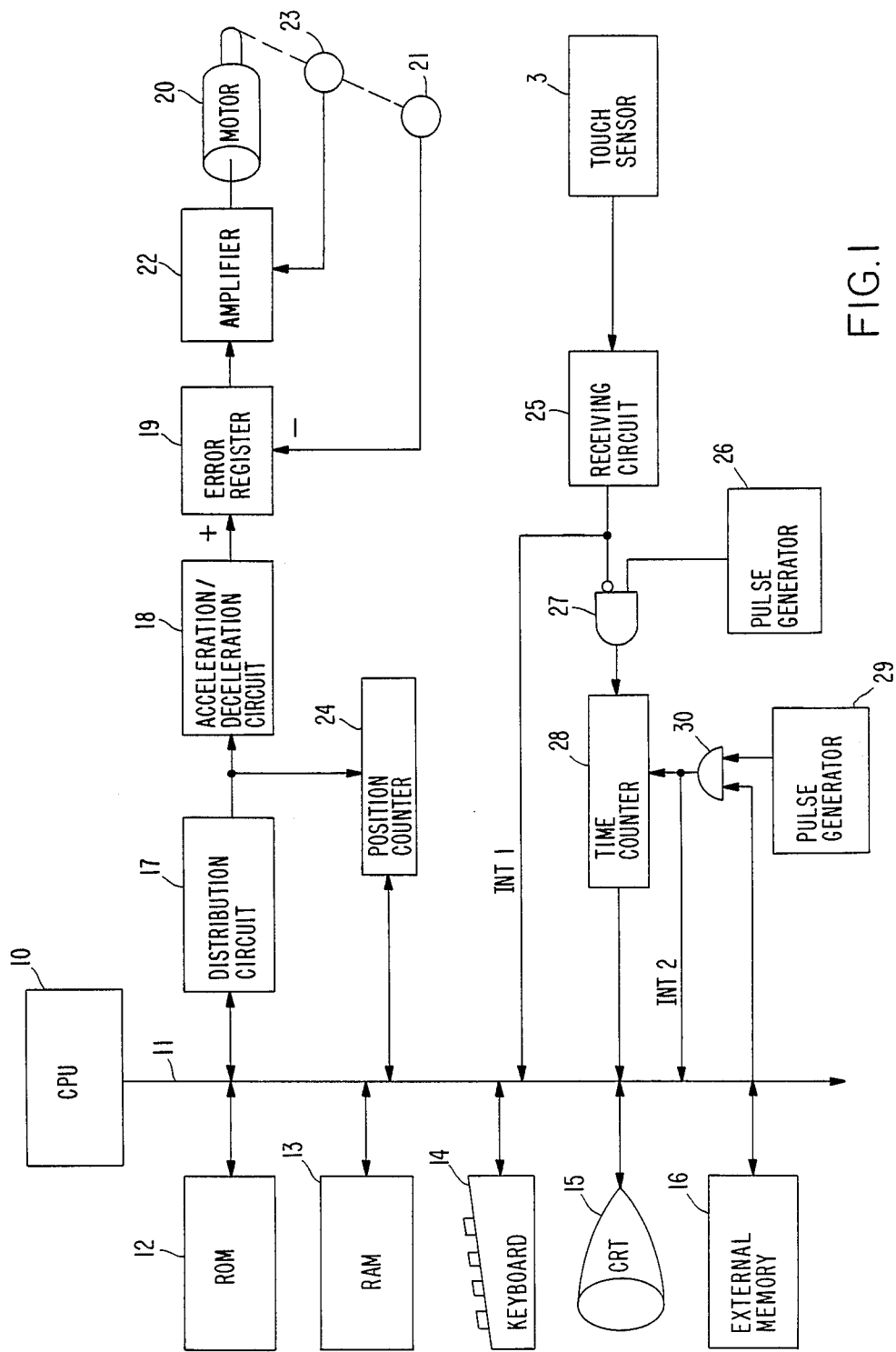
FIG. 1 is a block diagram illustrating the principal parts of an embodiment of a numerical controller equipped with the distance-of-travel measuring equipment of the present invention.

FIG. 1 illustrates, in block form, the principal parts of an embodiment of a numerical controller provided with the distance-of-travel measuring equipment of the present invention. For convenience of description, the drive axis system shown is only an X-axis one.

In FIG. 1, reference numeral 10 indicates a CPU, which is connected to peripheral circuits via a bus 11 which includes a data bus, an address bus, and a control bus. A ROM 12 is a read only memory for storing a system program, or the like. A RAM 13 is a write/read memory, which has areas for storing the feed rate Fm, the acceleration/deceleration time constant TC, the servo time constant TS, and the delay time TR of the skip signal receiving system, and an operation area. A keyboard 14 has various keys such as numeral keys and alphabet keys, through which the abovementioned feed rate Fm and so on are entered. A CRT 15 displays the contents of a program or the amount of travel $P_n'$ described later. An NC machining program is stored in an external memory 16 which is formed by a magnetic bubble memory, a CMOS memory provided with a backup power supply, or the like.

A move command is interpreted by the CPU 10, from which an amount of travel for every predetermined time, for example, 8 ms, is provided to a distribution circuit 17. The output of the distribution circuit 17 is applied to an acceleration/deceleration circuit 18, wherein the output is accelerated or decelerated as predetermined, and the output of the acceleration/deceleration circuit 18 is applied to an error register 19. The error register 19 obtains the difference between a feedback signal from a position sensor 21, for sensing the rotational position of an X-axis motor 20, and the output signal from the acceleration/deceleration circuit 18, and causes an amplifier 22 to generate a voltage proportional to the difference, driving the X-axis motor 20. The X-axis motor 20 has mounted thereon a velocity sensor 23, from which a velocity feedback signal is fed back to the amplifier 22. As the X-axis motor 20 is driven, an X-axis table (not shown) is moved and the tool 1 secured to the chuck 2 travels in the X-axis direction accordingly.

The output of the distribution circuit 17 is provided to a position counter 24 as well, wherein the amount of travel for every predetermined period is accumulated. The value of the position counter 24 represents the current position (the current position in the numerical controller) along the X-axis as viewed from the numerical controller side and can be read out by the CPU 10.

The touch sensor 3 is to develop a skip signal upon sensing that the tool has abutted; various kinds of sensors having a mechanical structure or employing a piezoelectric element can be adopted. In the case of measuring the tool length L, the touch sensor 3 is disposed at a predetermined position on the side toward which the tool 1 is moved. The skip signal from the touch sensor 3 is received by a receiving circuit 25. On receiving the skip signal, the receiving circuit 25 provides an interrupt signal INT1 via the bus 11 to the CPU 10 and, at the same time, disables a gate circuit 27.

The gate circuit 27 is supplied at the other input with the output of a pulse generator 26 which creates pulses of a period sufficiently shorter than 8 ms, for example, about 2 μs. When the gate circuit 27 is open, the pulses are applied as count-up pulses to a time counter 28. The time counter 28 counts the output pulses of the gate circuit 27, and is cleared, via a gate circuit 30, by a pulse which is generated by a pulse generator 29 every 8 ms. The output pulse of the pulse generator 29, via the gate circuit 30, is provided as an interrupt signal INT2 via the bus 11 to the CPU 10 as well.

Prior to the measurement of the tool length L, the feed rate Fm, the acceleration/deceleration time constant TC of the acceleration/deceleration circuit 18, the servo time constant TS of the servo system, and the delay time TR of the receiving system, including the receiving circuit 25 and so on, which are used for measuring the tool length L, are stored as parameters in the RAM 13 from the keyboard 14. In this case, the feed rate Fm is given in mm/min and the acceleration/deceleration time constant, the servo time constant, and the delay of. the skip signal receiving system are given in msec.

Figure 3A:
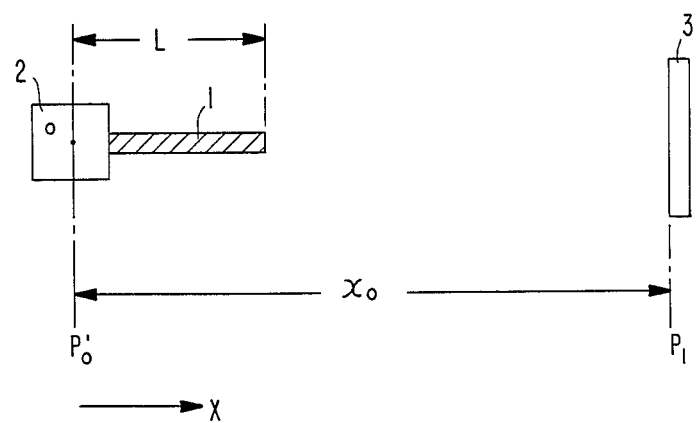
FIGS. 3A and 3B are schematic views of a tool length measuring system employing a skip function and a touch sensor in combination.

Next, a move command based on the distance measuring code is entered from, for instance, the keyboard 14. For example, in the case where the distance between the reference point 0 of the tool 1 before measurement and the touch sensor 3 is $x_0$, as shown in FIG. 3A, a command is input which includes an amount of travel greater than $x_0$, such as given below.

G31X1000Fm;

Here, G31 is a distance measuring function code for executing the skip function, X1000 the amount of travel, and Fm the feed rate.

Further, upon input of an execution command from the keyboard 14, the CPU 10 performs preprocessing (S1), in the main process, for executing the function code G31, as depicted in FIG. 2(A), and then reads the contents of the position counter 24 before measurement, that is, the position $P_0$ of the reference point 0 (S2). Then the CPU 10 allows an interruption by the interrupt signals INT1 and INT2 (S3) and waits for the termination of the interruption handling routine (S4).

Figure 3B:
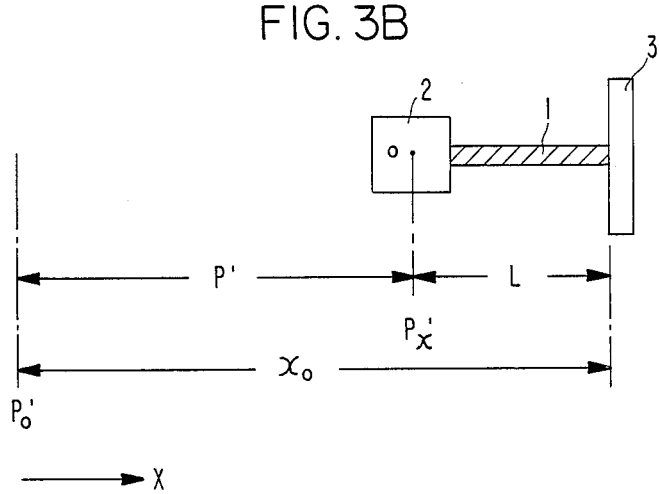

After the interruption is allowed, 8 ms interruption handling routine, as shown in FIG. 2B, is executed upon each occurrence of the pulses of the 8 ms period which are provided from the pulse generator 29. In this interruption handling routine, the CPU 10 stores first, the contents of the position counter 24 at the time of interruption in an internal register A (S10) and then obtains the difference between the stored contents of position counter 24 and the value of the internal register A at the time of the preceding interruption, thereby obtaining the variation $\alpha$ in the stored value of the position counter 24 in 8 ms (S11). Next, the CPU 10 orders the distribution circuit 17 to effect the pulse distribution for the current interruption (S12). In response to this, a distribution command value is provided from the distribution circuit 17 to the acceleration/deceleration circuit 18, with the result that the tool 1 travels in the X-axis direction at the feed rate Fm, as illustrated in FIGS. 3A and 3B. Furthermore, the position of the reference point 0 as viewed from the numerical controller is updated by counting the output pulses of the distribution circuit 17 with the position counter 24.

It should be noted here that during the travel of the tool 1 the contents of the position counter 24 do not exactly indicate the actual position of the reference point 0. That is, since the output of the distribution circuit 17 is subjected to acceleration/deceleration by the acceleration/deceleration circuit 18, the circuit 18 has an error corresponding to the acceleration/deceleration control and the error register 19 also has an error corresponding to the feed rate, therefore the actual position of the reference point 0 is short of the position indicated by the position counter 24. Also, the CPU 10 detects whether or not the interruption by the interrupt signal INT1 has occurred (S13), and if so, CPU 10 then suspends the pulse distribution (S14), and disables the gate circuit 30 to prevent the time counter 28 from being cleared (S15).

When the tip of the tool 1 has abutted against the touch sensor 3, as a result of the continuation of the pulse distribution which takes place every 8 ms, the touch sensor 3 delivers a skip signal. Upon reception of the skip signal by the receiving circuit 25, the skip signal output is provided to the gate circuit 27 to disable gate circuit 27 and stop the supply of the count-up signals to the time counter 28, and the interrupt signal INT1 is input to the CPU 10. The count value $\beta$, of the time when counter 28 was stopped from counting, indicates the time period from the moment of termination of the immediately preceding 8 ms period to the moment of input of the skip signal. However, since the receiving circuit 25 generates the output signal a little after the abutting of the tip of the tool 1 against the touch sensor 3, the count value $\beta$ will become larger, due to time delay TR, than the value at the time when the tip of the tool 1 abutted against the touch sensor 3.

In the interruption handling routine for the interrupt signal INT1, for example, as shown in FIG. 2(C), the CPU 10 obtains the amount of travel P by subtracting the value P$_0$, of the position counter 24 at the start of the measurement, from the value of the internal register A (the value of the position counter 24 at the end of the immediately preceding 8 ms period) (S20) and then reads the count value $\beta$ of the time counter 24, which is now out of operation (S21). Next, the CPU 10 obtains the amount of travel P$_n$ by the following expression (S22).

$$P_n = P + \alpha + \beta/\gamma \tag{2}$$

where $\gamma$ is the maximum number which the time counter 24 can count in 8 ms.

Next, the actual amount of travel P$_n'$ is calculated by the following expression (S23) and is displayed on the CRT 15.

$$P_n' = P_n - Fm(TC + TS + TR)/60 \times 1000 \tag{3}$$

The value P$_n'$ is very close to the actual amount of travel P' because P$_n'$ is subjected to the correction of such factors as the acceleration/deceleration time constant, and the like, of the tool 1 and because the time of input of the skip signal is immediately detected by the time counter 28 hardware.

In the above embodiment, the value P$_n'$ is displayed on the outside (S24). An arrangement is also possible in which the tool length L is obtained from the values P$_n'$ and x$_0$ and displayed on the outside. Also, an arrangement is possible to display the amount of travel P$_n$ on the outside and manually perform the calculation of the expression (1) by the operator.

As described above, according to the present invention, where a skip signal is input in the period of updating: the position storage means for accumulating distribution command values; the position of the reference point at the point of termination of the directly preceding predetermined period is detected, from the stored value of the position storage means; and the distance from the termination of the directly preceding predetermined period to the point of input of the skip signal is obtained, from the contents $\beta$ of the time counter 28 and the variation $\alpha$ in the stored value of the position storage means, during the predetermined period. The time counter 28 is counted up by the clock pulses of a period shorter than the predetermined period. Accordingly, the rise of the skip can be detected within a period shorter than the predetermined period, producing the effect of improving the accuracy of measurement of the distance of travel without increasing the load on software.

I claim:

1. Distance-of-travel measuring equipment for a numerical controller, including a central processing unit, which functions to linearly control a movable machine part by executing a linear interpolation upon application of a move command, which uses a distance measuring function code, and suspending the execution of the move command upon application of a skip signal which is input from an outside source in the execution of the command, comprising:
   (a) position storage means for accumulating distribution command values which are generated within a predetermined period for executing the move command using the distance measuring function code;
   (b) means for storing a stored value P$_0$ of the position storage means immediately before the execution of the distance measuring function code;
   (c) a time counter which is cleared within the predetermined period;
   (d) means for generating output pulses of a period shorter than the predetermined period;
   (e) a gate circuit for providing the output pulses of the pulse generator means as count-up pulses to the time counter until the skip is input;
   (f) first operating means for obtaining a difference P between a stored value A of the position storage means at the time of input of the skip signal and the stored value $P_0$; and (g) second operating means for obtaining an amount of travel $P_n$, at the time of input of the skip signal, from a count value $\beta$ of the time counter at the time of input of the skip signal, a maximum count number $\gamma$ of the time counter in the predetermined period, a variation $\alpha$, as determined by the CPU, in the stored value of the position storage means during the predetermined period, and the difference P.

2. Distance-of-travel measuring method for numerical control, including the steps of linearly controlling a movable machine tool, by executing a linear interpolation upon application of a move command using a measuring function code, and suspending the execution of the move command upon application of a skip signal, comprising the steps of:

(a) accumulating distribution command values which are generated within a predetermined period for executing the move command using the distance measuring function code;

(b) storing a first stored value immediately prior to execution of the distance measuring function code and a second stored value representing a starting position of the machine tool;

(c) generating output pulses of a period shorter than the predetermined period;

(d) receiving and counting the output pulses of a period shorter than the predetermined period, until the time when the skip signal is applied;

(e) obtaining a difference between the first stored value and the second stored value, at the time of application of the skip signal; and (f) obtaining an amount of travel at the time of application of the skip signal from the accumulated distribution command values which are generated within a predetermined period and the difference as obtained in step (e).

* * * * *